US012705096B2

(12) United States Patent
Ha et al.

(10) Patent No.: US 12,705,096 B2
(45) Date of Patent: Aug. 11, 2026

(54) WINDOW-BASED DYNAMIC SCRUBBING SCHEDULING METHOD

(71) Applicant: SHANGHAITECH UNIVERSITY, Shanghai (CN)

(72) Inventors: Yajun Ha, Shanghai (CN); Rui Li, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 384 days.

(21) Appl. No.: 18/542,792

(22) Filed: Dec. 18, 2023

(65) Prior Publication Data

US 2024/0281282 A1 Aug. 22, 2024

Related U.S. Application Data

(63) Continuation of application No. PCT/CN2023/083564, filed on Mar. 24, 2023.

(30) Foreign Application Priority Data

Feb. 16, 2023 (CN) ........................ 202310126349.9

(51) Int. Cl.
*G06F 9/48* (2006.01)

(52) U.S. Cl.
CPC ................................. *G06F 9/4881* (2013.01)

(58) Field of Classification Search
CPC .................................................. G06F 9/4881
See application file for complete search history.

(56) References Cited

U.S. PATENT DOCUMENTS 8,332,722 B1 * 12/2012 Vera Rojas ...... H03K 19/17764 714/752
9,274,895 B1 * 3/2016 Wojahn ................ G06F 11/076
(Continued)

FOREIGN PATENT DOCUMENTS

CN 111858463 A * 10/2020 ............ G06F 30/34

OTHER PUBLICATIONS

Li R, Yu H, Jiang W, Ha Y. DVFS-based scrubbing scheduling for reliability maximization on parallel tasks in SRAM-based FPGAs. In2020 57th ACM/IEEE Design Automation Conference (DAC) Jul. 20, 2020 (pp. 1-6). IEEE. (Year: 2020).*
(Continued)

*Primary Examiner* — James R Turchen
(74) *Attorney, Agent, or Firm* — Bayramoglu Law Offices LLC

(57) ABSTRACT

A window-based dynamic scrubbing scheduling method is provided. By dynamically scheduling a user task and a scrubbing task, the method can reduce scrubbing conflicts of a field-programmable gate array (FPGA) scrubbing module and scrub each user task in a timely manner as much as possible. The method greatly reduces area and energy consumption overheads of a hardware circuit, and improves system reliability. The method proposes a negotiation-driven scrubbing scheduling algorithm and an integer linear programming (ILP)-based optimization-driven scrubbing scheduling algorithm. Based on global conflict information, the algorithms in the method can scrub more user tasks and improve the system reliability. The method ensures reliability of a mixed-criticality task set system. The method provides a dynamic voltage and frequency scaling (DVFS)-based multi-Internet Content Adaptation Protocol (ICAP) port allocation algorithm that can explore an impact of
(Continued)

FPGA architecture support on the system reliability to further optimize the system reliability.

7 Claims, 4 Drawing Sheets

(56) References Cited

U.S. PATENT DOCUMENTS

| | | | | |
|---|---|---|---|---|
| 2011/0107158 | A1* | 5/2011 | Espinosa | G06F 11/106<br>714/54 |
| 2013/0305199 | A1 | 11/2013 | He et al. | |
| 2022/0309217 | A1* | 9/2022 | Li | G06F 30/34 |

OTHER PUBLICATIONS

Zhang RS, Xiao LY, Cao XB, Li J, Li JQ, Li LZ. A fast scrubbing method based on triple modular redundancy for SRAM-Based FPGAs. In2018 14th IEEE International Conference on Solid-State and Integrated Circuit Technology (ICSICT) Oct. 31, 2018 (pp. 1-3). IEEE. (Year: 2018).*

Santos R, Venkataraman S, Kumar A. Scrubbing mechanism for heterogeneous applications in reconfigurable devices. ACM Transactions on Design Automation of Electronic Systems (TODAES). Feb. 9, 2017;22(2):1-26. (Year: 2017).*

Rui Santos, et al., Criticality-aware Scrubbing Mechanism for SRAM-based FPGAs, 24th International Conference on Field Programmable Logic and Applications (FPL), 2014, pp. 1-8.

Dimitris Agiakatsikas, et al., Reconfiguration Control Networks for TMR Systems with Module-based Recovery, IEEE 24th Annual International Symposium on Field-Programmable Custom Computing Machines, 2016, pp. 88-91.

Matthew J. Cannon, et al., Strategies for Removing Common Mode Failures from TMR Designs Deployed on SRAM FPGAs, IEEE Transactions on Nuclear Science, 2018, pp. 1-9.

Raghuraman Balasubramanian, et al., Virtually-Aged Sampling DMR: Unifying Circuit Failure Prediction and Circuit Failure Detection, Micro'46, 2013, pp. 123-135.

Naifeng Jing, et al., Redundancy based Interconnect Duplication to Mitigate Soft Errors in SRAM-based FPGAs, IEEE/ACM International Conference on Computer-Aided Design (ICCAD), 2015, pp. 764-769.

Alexis Ramos et al., An ALU protection methodology for soft processors on SRAM-based FPGAs, IEEE Transactions on Computers, 2019, pp. 1-8.

Rui Santos, et al., Dynamically Adaptive Scrubbing Mechanism for Improved Reliability in Reconfigurable Embedded Systems, 52nd ACM/EDAC/IEEE Design Automation Conference (DAC), 2015, pp. 1-6.

Rui Li, et al., DVFS-Based Scrubbing Scheduling for Reliability Maximization on Parallel Tasks in SRAM-based FPGAs, 57th ACM/IEEE Design Automation Conference (DAC), 2020, pp. 1-6.

Rui Li, et al., Criticality-Aware Negotiation-Driven Scrubbing Scheduling for Reliability Maximization in SRAM-Based FPGAs, IEEE Transactions on Computer-Aided Design of Integrated Circuits and Systems, 2023, pp. 3883-3894, vol. 42 No. 11.

* cited by examiner

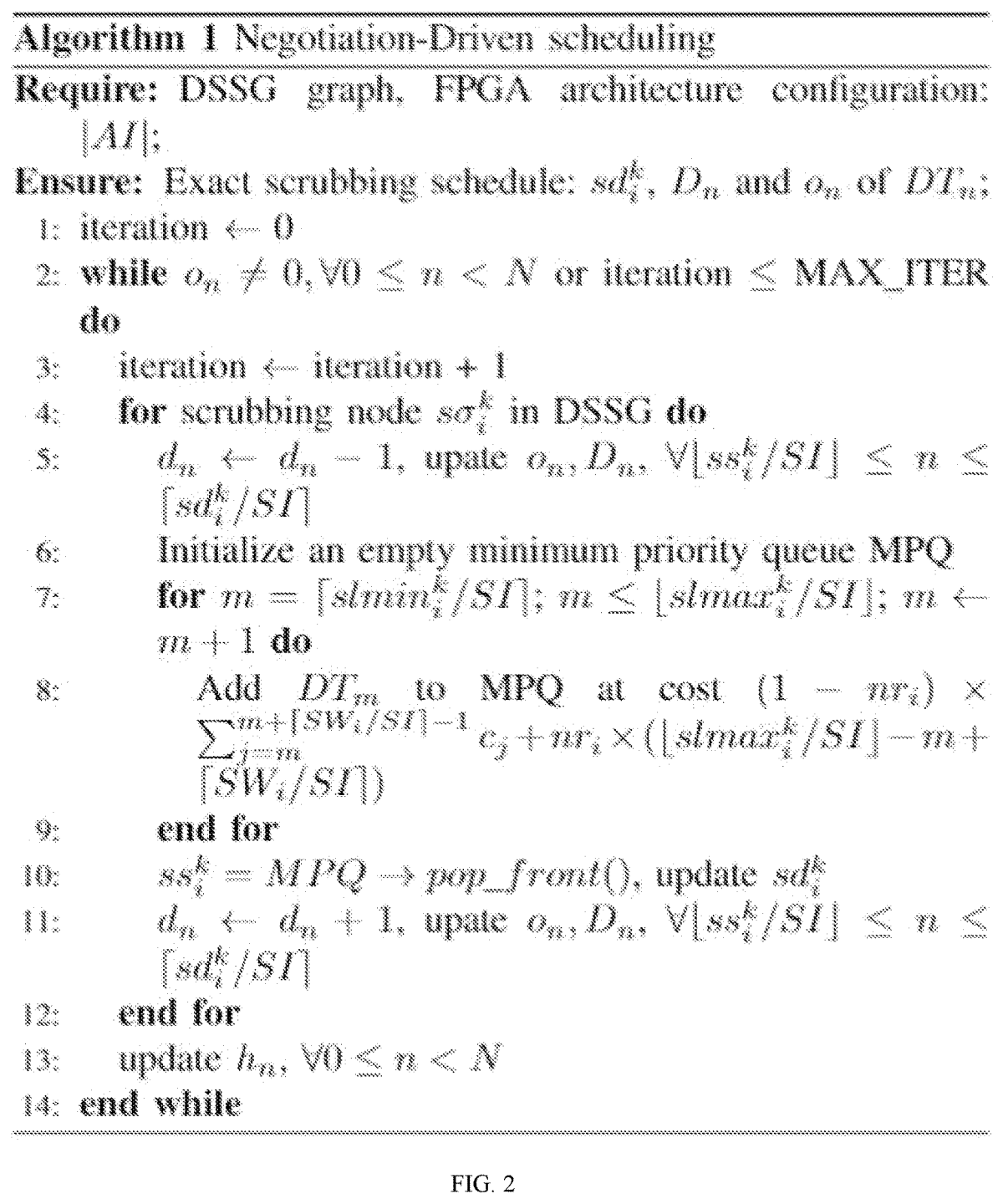

Algorithm 1 Negotiation-Driven scheduling

Require: DSSG graph, FPGA architecture configuration: $|AI|$;

Ensure: Exact scrubbing schedule: $sd_i^k$, $D_n$ and $o_n$ of $DT_n$;

1: iteration ← 0
2: while $o_n \neq 0, \forall 0 \leq n < N$ or iteration ≤ MAX_ITER do
3: iteration ← iteration + 1
4: for scrubbing node $so_i^k$ in DSSG do
5: $d_n \leftarrow d_n - 1$, upate $o_n, D_n, \forall \lfloor ss_i^k/SI \rfloor \leq n \leq \lceil sd_i^k/SI \rceil$
6: Initialize an empty minimum priority queue MPQ
7: for $m = \lceil slmin_i^k/SI \rceil$; $m \leq \lfloor slmax_i^k/SI \rfloor$; $m \leftarrow m + 1$ do
8: Add $DT_m$ to MPQ at cost $(1 - nr_i) \times \sum_{j=m}^{m+\lceil SW_i/SI \rceil - 1} c_j + nr_i \times (\lfloor slmax_i^k/SI \rfloor - m + \lceil SW_i/SI \rceil)$
9: end for
10: $ss_i^k = MPQ \rightarrow pop\_front()$, update $sd_i^k$
11: $d_n \leftarrow d_n + 1$, upate $o_n, D_n, \forall \lfloor ss_i^k/SI \rfloor \leq n \leq \lceil sd_i^k/SI \rceil$
12: end for
13: update $h_n, \forall 0 \leq n < N$
14: end while

FIG. 2

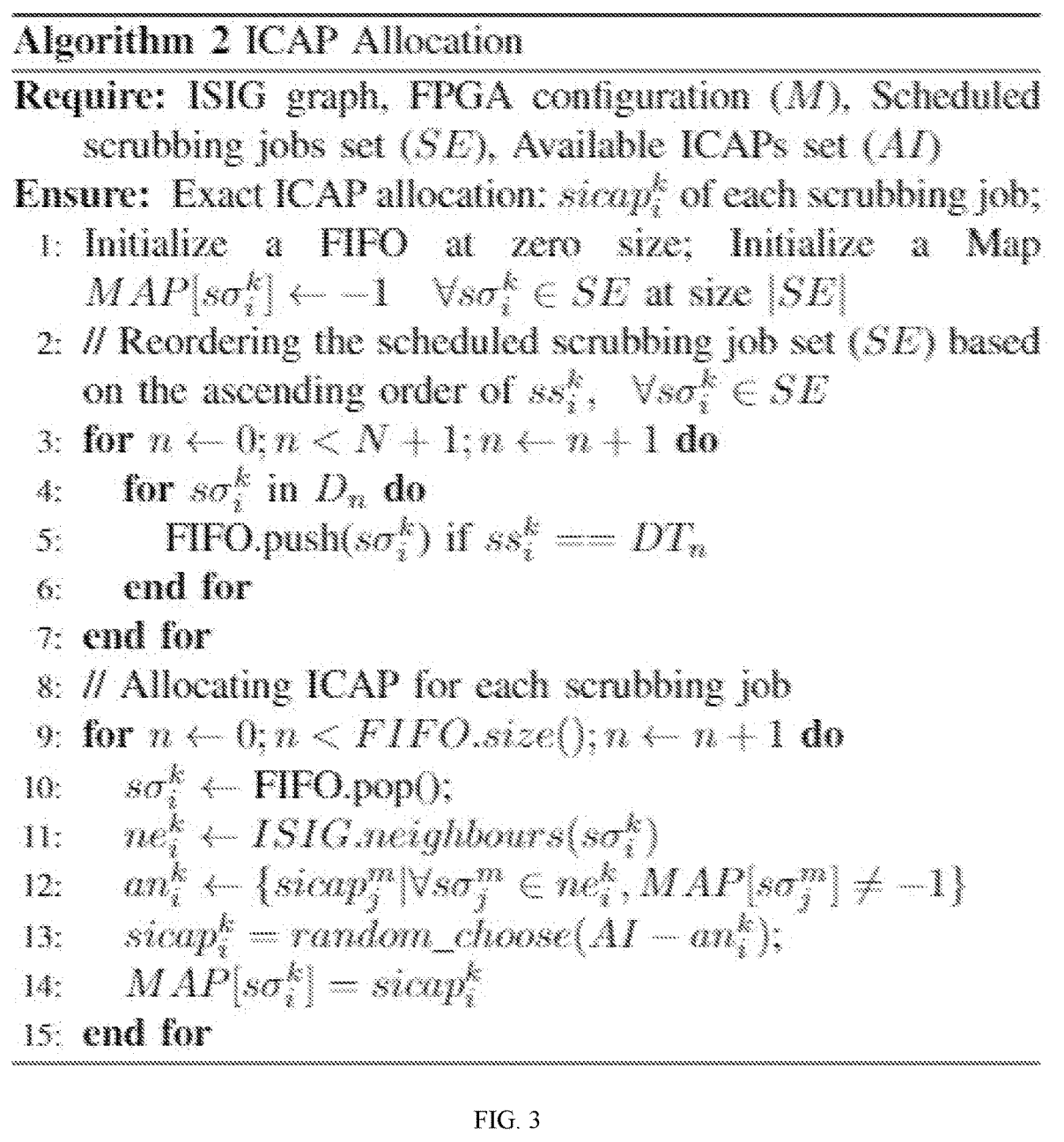

Algorithm 2 ICAP Allocation

Require: ISIG graph, FPGA configuration ($M$), Scheduled scrubbing jobs set ($SE$), Available ICAPs set ($AI$)

Ensure: Exact ICAP allocation: $sicap_i^k$ of each scrubbing job;

1: Initialize a FIFO at zero size; Initialize a Map $MAP[s\sigma_i^k] \leftarrow -1 \quad \forall s\sigma_i^k \in SE$ at size $|SE|$ 2: // Reordering the scheduled scrubbing job set ($SE$) based on the ascending order of $ss_i^k, \quad \forall s\sigma_i^k \in SE$ 3: for $n \leftarrow 0; n < N + 1; n \leftarrow n + 1$ do

4:     for $s\sigma_i^k$ in $D_n$ do

5:         FIFO.push($s\sigma_i^k$) if $ss_i^k == DT_n$

6:     end for

7: end for

8: // Allocating ICAP for each scrubbing job

9: for $n \leftarrow 0; n < FIFO.size(); n \leftarrow n + 1$ do

10:     $s\sigma_i^k \leftarrow$ FIFO.pop();

11:     $ne_i^k \leftarrow ISIG.neighbours(s\sigma_i^k)$

12:     $an_i^k \leftarrow \{sicap_j^m | \forall s\sigma_j^m \in ne_i^k, MAP[s\sigma_j^m] \neq -1\}$ 13:     $sicap_i^k = random\_choose(AI - an_i^k)$;

14:     $MAP[s\sigma_i^k] = sicap_i^k$

15: end for

FIG. 3

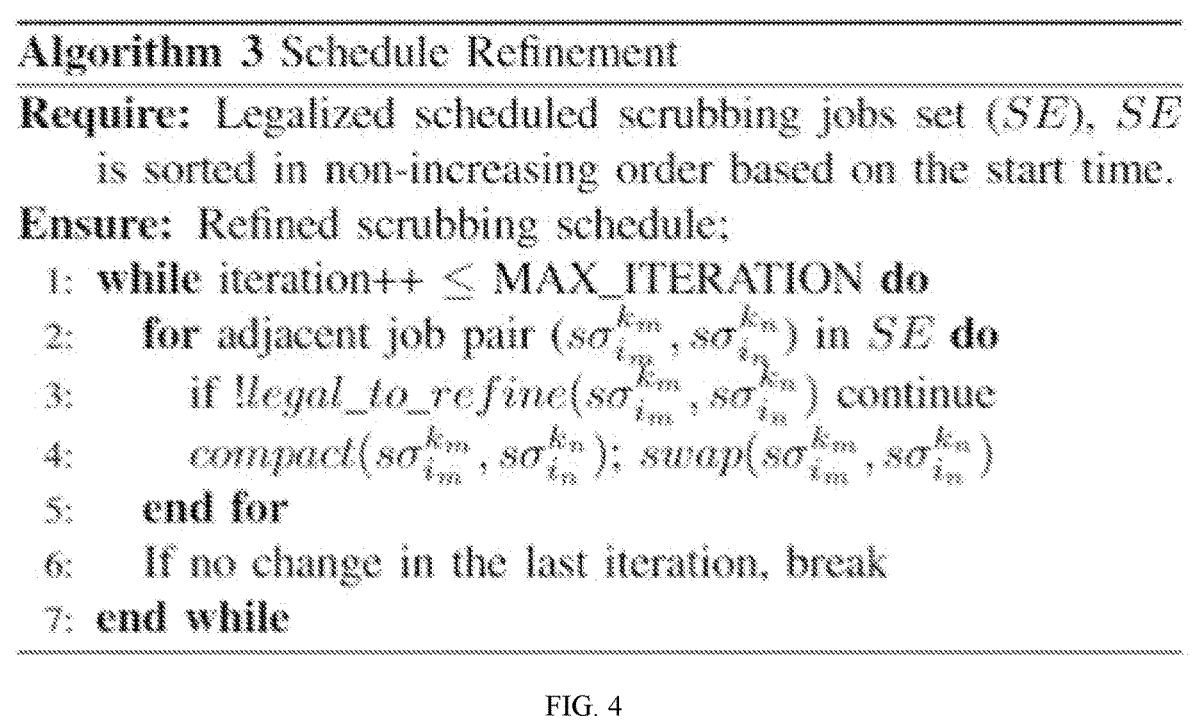

Algorithm 3 Schedule Refinement

Require: Legalized scheduled scrubbing jobs set $(SE)$, $SE$ is sorted in non-increasing order based on the start time.

Ensure: Refined scrubbing schedule;

1: while iteration++ $\leq$ MAX_ITERATION do
2: for adjacent job pair $(s\sigma_{i_m}^{k_m}, s\sigma_{i_n}^{k_n})$ in $SE$ do
3: if $!legal\_to\_refine(s\sigma_{i_m}^{k_m}, s\sigma_{i_n}^{k_n})$ continue
4: $compact(s\sigma_{i_m}^{k_m}, s\sigma_{i_n}^{k_n})$; $swap(s\sigma_{i_m}^{k_m}, s\sigma_{i_n}^{k_n})$
5: end for
6: If no change in the last iteration, break
7: end while

FIG. 4

WINDOW-BASED DYNAMIC SCRUBBING SCHEDULING METHOD

CROSS REFERENCE TO THE RELATED APPLICATIONS

This application is the continuation application of International Application No. PCT/CN2023/083564, filed on Mar. 24, 2023, which is based upon and claims priority to Chinese Patent Application No. 202310126349.9, filed on Feb. 16, 2023, the entire contents of which are incorporated herein by reference.

TECHNICAL FIELD

The present disclosure relates to a novel window-based dynamic scrubbing scheduling algorithm for reducing scrubbing conflicts of a field-programmable gate array (FPGA) scrubbing module and improving reliability of a static random access memory (SRAM)-based FPGA in a high-radiation environment.

BACKGROUND

A SRAM-based FPGA is an energy-efficient computing platform for applications of smart cars and the like. The SRAM-based FPGA has a powerful computing capability and is flexible in reconfiguring a circuit. However, in terms of system reliability, when FPGAs are exposed to a high-intensity radiation environment like space, they will be affected by single event upset (SEU). In this case, because charged particles impact a chip, a state of a configuration memory of the chip and a state of an on-chip memory (BRAM or Flip-flop) may be flipped [1], which may change a function of hardware and lead to an incorrect operating result.

Currently, there are two types of mainstream methods for ensuring reliability of an FPGA system. In the first type of methods, spatial redundancy, such as triple modular redundancy (TMR) [2, 3], dual modular redundancy (DMR) [4], or interconnection redundancy [5], is used to detect and mitigate an error. The methods based on spatial redundancy achieve high reliability by replicating a user design for a plurality of times. Therefore, the methods based on spatial redundancy have high circuit area and energy overheads, and some of the methods also attempt to balance reliability and a resource overhead by replicating a partial design or strengthening a specific design unit [6]. Although the methods based on spatial redundancy have high reliability, these methods all face problems of high energy consumption and area overheads of an FPGA circuit and long average fault repairing time.

To address these problems, the second type of methods improve the system reliability by using a scheduling-based scrubbing technology instead of the expensive spatial redundancy technology [1, 7, 8]. These methods try to scrub a configuration memory of each task before executing the user task, so as to ensure correctness of the hardware before executing the user task. Due to lack of system redundancy, this type of methods have smaller area and power consumption overheads. However, when there are parallel or massive tasks, there may be numerous scrubbing requests frequently. As a result, a system scrubbing port (ICAP) is busy, decreasing the system reliability.

CITED REFERENCES

[1] R. Santos, S. Venkataraman, A. Das, and A. Kumar, "Criticality-aware scrubbing mechanism for sram-based fpgas," in 2014 24th International Conference on Field Programmable Logic and Applications (FPL), September 2014, pp. 1-8.

[2] D. Agiakatsikas, N. T. H. Nguyen, Z. Zhao, T. Wu, E. Cetin, O. Diessel, and L. Gong, "Reconfiguration control networks for tmr systems with module-based recovery," in 2016 IEEE 24th Annual International Sym-posium on Field-Programmable Custom Computing Machines (FCCM), May 2016, pp. 88-91.

[3] M. J. Cannon, A. M. Keller, H. C. Rowberry, C. A. Thurlow, A. Perez-Celis, and M. J. Wirthlin. Strategies for removing common mode failures from tmr designs deployed on sramfpgas. IEEE Transactions on Nuclear Science, 66(1):207-215, 2019.

[4] R. Balasubramanian and K. Sankaralingam. Virtually-aged samplingdmr: Unifying circuit failure prediction and circuit failure detection. In 2013 46th Annual IEEE/ACM International Symposium on Microarchi-tecture (MICRO), pages 123-135, 2013.

[5]N. Jing, J. Zhou, J. Jiang, X. Chen, W. He, and Z. Mao. Redundancy based interconnect duplication to mitigate soft errors in sram-based fpgas. In 2015 IEEE/ACM International Conference on Computer-Aided Design (ICCAD), pages 764-769, 2015.

[6] A. Ramos, R. G. Toral, P. Reviriego, and J. A. Maestro. An alu protection methodology for soft processors on sram-based fpgas. IEEE Transactions on Computers, 68(9): 1404-1410, 2019.

[7] R. Santos, S. Venkataraman, and A. Kumar, "Dynamically adaptive scrubbing mechanism for improved reliability in reconfigurable embedded systems," in 2015 52nd ACM/EDAC/IEEE Design Automation Conference (DAC), June 2015, pp. 1-6.

[8] R. Li, H. Yu, W. Jiang, and Y. Ha. Dvfs-based scrubbing scheduling for reliability maximization on parallel tasks in sram-based fpgas. In 2020 57th ACM/IEEE Design Automation Conference (DAC), pages 1-6, 2020.

SUMMARY

The present disclosure aims to resolve a technical problem that a SRAM-based FPGA is unreliable in a high-radiation environment.

In order to resolve the above technical problem, the technical solutions of the present disclosure provide a window-based dynamic scrubbing scheduling method, including the following steps:

step 1: controlling scheduling congestion between scrubbing jobs by performing linear integer programming (LIP) and using a usage rate ubound of an Internet Content Adaptation Protocol (ICAP) module in a field-programmable gate array (FPGA) system, and generating a candidate scrubbing job within each scrubbing cycle;

step 2: scheduling the scrubbing job proposed in the step 1 while minimizing scrubbing port conflicts between different scrubbing jobs, where a scrubbing conflict is resolved by using a heuristic negotiation-driven scheduling (NDS) algorithm or an integer linear programming (ILP)-based optimization-driven scheduling (ODS) method, where scrubbing scheduling is converted by the heuristic NDS algorithm into an ILP problem for solution;

where the NDS algorithm is an iterative algorithm, and each iteration includes the following steps:

step 201: calculating a shortest path from a scrubbing task node to a maximum feasible scheduling interval of the scrubbing task node based on $path_{cost}$ in a following formula:

$$path_{cost} = conflict_{cost} + reliability_{cost} = (1-\xi_i)\times\sum_{n=m} c_n + \xi_i \times\left(\left\lfloor\frac{sl\max_i^k}{SI}\right\rfloor - m + \left\lceil\frac{SW_i}{SI}\right\rceil\right)$$

where $conflict_{cost}$ represents a result of subtracting a total quantity of available ICAP ports in the system from a total quantity of ICAP ports required by the system during a scrubbing period of a currently considered scrubbing job; $reliability_{cost}$ represents a time interval between the currently considered scrubbing job and a corresponding user job, $c_n$ represents a congestion level on a time node n, SI represents a minimum unit of time discretization, $$sl\max_i^k$$

represents a maximum feasible scheduling interval of a $k^{th}$ scrubbing job of an $i^{th}$ scrubbing task, $SW_i$ represents running time of the $i^{th}$ scrubbing task, m represents a currently investigated time node, and $\xi_i$ represents importance of an $i^{th}$ user task;

step 202: scheduling the scrubbing job to a first time node on the shortest path to obtain optimal scheduling of the current scheduling job;

step 203: updating a congestion level $c_n$ on a time node on which the scrubbing scheduling job is scheduled; and step 204: continuously scheduling a remaining scrubbing job until there is no conflict between scrubbing tasks or a specified maximum quantity of iterations is reached;

step 3: identifying a conflicting scrubbing job that cannot be resolved in the step 2, and dynamically deleting some scrubbing tasks to ensure that there is no conflict between legalized scrubbing job scheduling; and if there are a plurality of ICAP scrubbing ports in the FPGA system, using an excess ICAP port to dynamically allocate a scrubbing port for each scrubbing task through graph coloring; and step 4: iteratively optimizing, based on a local optimal scheduling condition, the scrubbing scheduling generated in the step 3, such that the generated scrubbing scheduling is finally executed by a scrubbing module.

Preferably, the step 1 includes the following steps:

step 101: adjusting a scrubbing cycle $ST_i$ of each user task by solving the ILP problem in a following formula:

$$\text{Objective:minimize} \sum_{i=1}^{|S\Lambda|}\frac{ST_i}{T_i}\times\xi_i \quad \text{s.t.} \sum_{i=1}^{|S\Lambda|}\frac{SW_i}{ST_{i_i}}\times \text{unbound}$$

where $SW_i$ represents scrubbing time of a scrubbing task corresponding to the $i^{th}$ user task, $T_i$ represents a running cycle of the $i^{th}$ user task, $ST_i$ represents a running cycle of the scrubbing task corresponding to the $i^{th}$ user task, $\xi_i$ represents the importance of the $i^{th}$ user task, $|S\Lambda|$ represents a quantity of scrubbing tasks in the FPGA system, and ubound represents a usage rate of the ICAP module in the FPGA system; and step 102: generating the candidate scrubbing job within each scrubbing cycle based on a scrubbing cycle of a generated scrubbing task for scheduling in a subsequent step; and if there are the plurality of ICAP scrubbing ports in the FPGA system, using the excess ICAP port to dynamically allocate the scrubbing port for each scrubbing task through the graph coloring.

Preferably, in the step 2, an ODS algorithm model includes three groups of 0-1 decision variables, namely $X,Y,Z=\{x_{lt}, y_{lt}, z_{lt};\ l=0, 1, \ldots, |SE|-1, t=0, 1, 2, \ldots, N-1\}$, where SE represents a job set containing all scrubbing jobs in the scheduling, |SE| represents a length of the job set, and N represents a time length of a current scheduling window, where when the heuristic NDS algorithm is used to resolve the scrubbing conflict, start time of each scrubbing task, namely, scrubbing task scheduling, is calculated by solving an integer planning system including an objective function shown in a formula (1) and a constraint condition shown in a formula (2);

$$\text{Minimize}_{\{X,Y,Z\}}\kappa_1 \times \text{relialibity} + \kappa_2 \times \text{conflict} \quad (1)$$

in the formula (1), the reliability function describes a time interval between a scrubbing task and a user task, $$\text{relialibity} = \sum_l \xi_l\left(\left(\sum_t ty_{lt}\right) - \left\lceil\frac{sl\max_l}{SI}\right\rceil\right),$$

and system reliability is optimized by minimizing the reliability function, where $\Sigma_t ty_{lt}$ describes the start time of each scrubbing task, SI represents the minimum unit of the time discretization, $slmax_l$ represents a maximum feasible scheduling interval of a scrubbing task l; $conflict=\Sigma_t z_t$, where a conflict between scrubbing tasks is optimized by minimizing the conflict function, and $z_t$ represents a port conflict for each time node; and $\kappa_1$ and $\kappa_2$ represent weights of the two objective functions; and $$\begin{cases} \sum_t y_{lt} = 1, \forall\ l = 0, 1, 2, \ldots |SE|-1 \\ \left\lceil\frac{sl\min_l}{SI}\right\rceil \le \sum_t ty_{lt} \le \left\lfloor\frac{sl\max_l}{SI}\right\rfloor, \forall\ l = 0, 1, 2, \ldots |SE|-1 \\ \sum_t x_{lt} = SW_l, \forall\ t = 0, 1, 2, \ldots N-1 \\ \sum_l x_{lt} - |AI| \le z_t, \forall\ t = 0, 1, 2, \ldots N-1 \\ \sum_{s=0}^{SW_l-1}(x_{\{l(t+s)\}} - 1) \ge SW_l(y_{lt} - 1), \forall\ t = 0, 1, 2, \ldots N-1 \end{cases} \quad (2)$$

in the formula (2), $slmin_l$ represents a minimum value of a feasible scheduling interval of the scrubbing job, and $SW_l$ represents running time required for the scrubbing job.

Preferably, the dynamically deleting some scrubbing tasks in the step 3 includes the following steps:

sequentially checking a congestion level for each time node: if a quantity of ICAP ports required on the current time node exceeds the total quantity of ICAP ports in the system, considering the current time node as an illegal scheduling node, and deleting some scrubbing jobs to meet a requirement for the quantity of ICAP ports;

if a congestion level on the current time node is greater than 0, calculating a probability of scrubbing each scrubbing job on the time node, and deleting the first n scrubbing jobs, where n represents a result of subtracting the total quantity of available ICAP ports in the system from the quantity of ICAP ports required on the time node; and iteratively traversing each time node of a current scheduling window until all conflicts are resolved.

Preferably, a probability of deleting each scrubbing job is calculated according to a following formula:

$$p_n^{i,k} = \frac{1}{1+e^{-\theta^T w}} = \frac{1}{1+e^{-(\theta_1 w_1 w_3 + \theta_2 w_2)}}$$

where $$p_n^{i,k}$$

represents a probability of deleting the $k^{th}$ scrubbing job of the $i^{th}$ scrubbing task on the $n^{th}$ time node, $w_1$, $w_2$, and $w_3$ respectively represent time since the $i^{th}$ user task is last scrubbed, a total quantity of conflicts between the $k^{th}$ scrubbing job and other scrubbing job, and importance of the $k^{th}$ scrubbing job of the $i^{th}$ scrubbing task, and $\theta_1$ and $\theta_2$ represent user-customized weights; and if there are the plurality of ICAP scrubbing ports in the system, a legalization step makes full use of the excess ICAP port to dynamically allocate the scrubbing port for each scrubbing task through the graph coloring.

Preferably, the dynamically allocating a scrubbing port to each scrubbing task in the step 3 includes the following steps:

step 301: arranging all scrubbing jobs in a scheduling window in an ascending order based on start time of all the scrubbing jobs; and step 302: allocating an ICAP port to each scrubbing job in an arrangement order, where a strategy for allocating the ICAP port to each scrubbing job is as follows: if the scrubbing job is located on a time node on which no ICAP port is allocated to other scrubbing job, randomly selecting any ICAP port in the FPGA system; or if the scrubbing job is located on a time node on which an ICAP port is already allocated to other scrubbing job, randomly selecting an unused ICAP port from the system.

Preferably, in the step 4, the iteratively optimizing, based on a local optimal scheduling condition, the scrubbing scheduling generated in the step 3 includes the following steps:

step 401: arranging all scrubbing jobs in a scheduling window in a descending order based on start time of all the scrubbing jobs; and step 402: sequentially optimizing two adjacent scrubbing jobs in an arrangement order, which specifically includes:

for the two adjacent scrubbing jobs, first running a compact operator; and if there is a time gap between the two scrubbing jobs, rescheduling a scrubbing job with earlier start time to make the scrubbing job adjacent to the other scrubbing job to eliminate the time gap; and for the two adjacent scrubbing jobs, running a swap operator, and if the two scrubbing jobs have different scrubbing time, swapping one scrubbing job with longer scrubbing time and the other scrubbing job with shorter scrubbing time to ensure that the other scrubbing job with the shorter scrubbing time always runs later.

The present disclosure proposes a novel window-based dynamic scrubbing scheduling algorithm. By dynamically scheduling a user task and a scrubbing task, the algorithm disclosed in the present disclosure can reduce scrubbing conflicts of an FPGA scrubbing module and scrub each user task in a timely manner as much as possible. Compared with an existing method, the method provided in the present disclosure greatly reduces area and energy consumption overheads of a hardware circuit, and improves system reliability. Compared with existing technical means, the present disclosure has following innovative points:

(1) The present disclosure proposes a negotiation-driven scrubbing scheduling algorithm and an ILP-based optimization-driven scrubbing scheduling algorithm. Based on global conflict information, the algorithms in the present disclosure can scrub more user tasks and improve the system reliability.

(2) The present disclosure proposes a dynamic scheduling legalization algorithm based on a logical probability model to ensure reliability of a mixed criticality task set system.

(3) The present disclosure proposes a dynamic voltage and frequency scaling (DVFS)-based multi-ICAP port allocation algorithm that can explore an impact of FPGA architecture support on the system reliability to further optimize the system reliability.

BRIEF DESCRIPTION OF THE DRAWINGS

FIG. 2 shows a pseudocode of a negotiation-based scrubbing scheduling algorithm (NDS);

FIG. 3 shows a pseudocode of an ICAP port allocation algorithm; and

FIG. 4 shows a pseudocode of a local scheduling improvement algorithm.

DETAILED DESCRIPTION OF THE EMBODIMENTS

Figure 1:
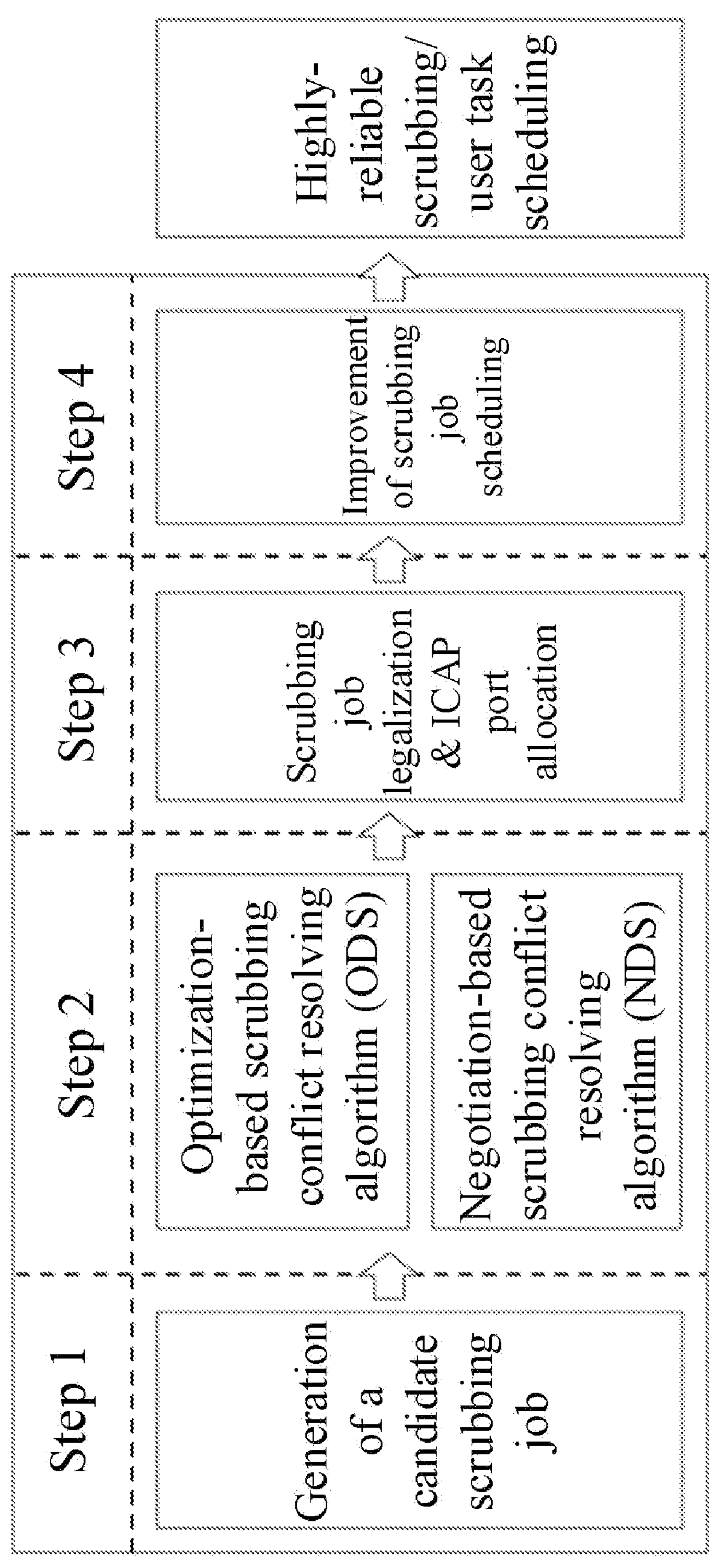
FIG. 1 is a general block diagram of the present disclosure.

The present disclosure will be further described below with reference to specific embodiments. It should be understood that these embodiments are only intended to describe the present disclosure, rather than to limit the scope of the present disclosure. In addition, it should be understood that various changes and modifications may be made on the present disclosure by those skilled in the art after reading the content of the present disclosure, and these equivalent forms also fall within the scope defined by the appended claims of the present disclosure.

As shown in FIG. 1, the present disclosure provides a window-based dynamic scrubbing scheduling method, including the following steps:

Step 1: A candidate scrubbing job set is generated, including a candidate scrubbing job. By performing LIP, the method in the present disclosure can provide more candidate scrubbing jobs for a critical task. In addition, in order to reduce scheduling pressure in a subsequent step, in the step 1, an ICAP utilization rate constraint is used to control scheduling congestion between scrubbing jobs, facilitating subsequent scheduling of a scrubbing job.

The step 1 specifically includes the following steps:

Firstly, scrubbing cycle $ST_i$ of each user task is adjusted by solving an ILP problem in formula (1):

$$\text{Objective: minimize } \sum_{i=1}^{|S\Lambda|} \frac{ST_i}{T_i} \times \xi_i \text{ s.t. } \sum_{i=1}^{|S\Lambda|} \frac{SW_i}{ST_{i_i}} \times ubound \quad (1)$$

In the formula (1), $SW_i$ represents scrubbing time of a scrubbing task corresponding to an $i^{th}$ user task, $T_i$ represents a running cycle of the $i^{th}$ user task, $ST_i$ represents a running cycle of the scrubbing task corresponding to the $i^{th}$ user task, $\xi_i$ represents importance of the $i^{th}$ user task, $|S\Lambda|$ represents a quantity of scrubbing tasks in an FPGA system, and ubound represents a usage rate of an ICAP module in the FPGA system.

A scrubbing cycle of each scrubbing task is obtained by solving the integer programming problem in the formula (1). It is obtained by minimizing the formula (1) that an important user task has a shorter scrubbing cycle, and a secondary user task has a longer scrubbing cycle. It is noted that in the formula (1), an ICAP utilization rate (ubound) in the system is also constrained, such that a quantity of generated candidate scrubbing jobs does not exceed a total ICAP utilization rate of the system, which effectively controls a congestion level between the generated scrubbing jobs. Based on a scrubbing cycle of a generated scrubbing task, a candidate scrubbing job is generated within each scrubbing cycle for scheduling in a subsequent step.

Step 2: A scrubbing conflict is resolved. In this step, the scrubbing job proposed in the step 1 is scheduled, and scrubbing port conflicts between different scrubbing tasks are minimized. A conflict resolving capability of this step directly affects quality of final scrubbing scheduling. Two methods for resolving the scrubbing conflict are proposed: a heuristic NDS algorithm, which can iteratively reduce scrubbing conflicts based on global conflict information; and an ILP-based ODS method, which provides an optimal scrubbing conflict resolving solution and can estimate a gap between the NDS method and the optimal solution. The following specifically describes ODS and NDS algorithms.

(1) ODS Algorithm

The ODS algorithm converts the scrubbing scheduling into the ILP problem for solution. An ODS algorithm model includes three groups of 0-1 decision variables, namely $X,Y,Z=\{x_{lt}, y_{lt}, z_{lt};\ l=0, 1, \ldots, |SE|-1, t=0, 1, 2, \ldots, N-1\}$, where SE represents a job set containing all scrubbing jobs in the scheduling, $|SE|$ represents a length of the job set, and N represents a time length of a current scheduling window.

$$\text{Minimize}_{\{X,Y,Z\}} \kappa_1 \times \text{relialibity} + \kappa_2 \times \text{conflict} \quad (2)$$

In the formula (2), the reliability function describes a time interval between a scrubbing task and a user task, where system reliability is optimized by minimizing the function, and $$\text{relialibity} = \sum_l \xi_l \left( \left( \sum_t t y_{lt} \right) - \left\lceil \frac{sl\max_l}{SI} \right\rceil \right).$$

$\Sigma_t t y_{lt}$ describes start time of each scrubbing and task, where SI represents a minimum unit of time discretization, $sl\max_l$ represents a maximum feasible scheduling interval of scrubbing task l. conflict$=\Sigma_t z_t$, where a conflict between scrubbing tasks is optimized by minimizing the conflict function, and $z_t$ represents a port conflict for each time node. $\kappa_1$ and $\kappa_2$ represent weights of the two objective functions, and a balance between the two objective functions is achieved by adjusting the weights.

By optimizing the objective function shown in the formula (2), the ODS algorithm can simultaneously optimize the system reliability and reduce conflicts between scrubbing tasks.

To ensure that the ODS algorithm generates the scheduling correctly, it is also required to constrain the objective function. The following formula (3) shows constraints of the system:

$$\begin{cases} \sum_t y_{lt} = 1, \forall\, l = 0, 1, 2, \ldots |SE|-1 \\ \left\lceil \frac{sl\min_l}{SI} \right\rceil \le \sum_t t y_{lt} \le \left\lfloor \frac{sl\max_l}{SI} \right\rfloor, \forall\, l = 0, 1, 2, \ldots |SE|-1 \\ \sum_t x_{lt} = SW_l, \forall\, t = 0, 1, 2, \ldots N-1 \\ \sum_l x_{lt} - |AI| \le z_t, \forall\, t = 0, 1, 2, \ldots N-1 \\ \sum_{s=0}^{SW_l-1} (x_{(l(t+s))} - 1) \ge SW_l(y_{lt} - 1), \forall\, t = 0, 1, 2, \ldots N-1 \end{cases} \quad (3)$$

A first constraint describes that each scrubbing task can only have one start time. A second constraint describes that the scrubbing task must be scheduled to a legal scheduling interval, where $sl\min_l$ represents a minimum value of a feasible scheduling interval for the scrubbing job. Third and fifth constraints state that each scrubbing task must run continuously for unit time of $SW_l$. A fourth constraint states that a quantity of ICAP ports used simultaneously on each time node cannot exceed $z_t$, which reflects a congestion level on the current time node.

The start time of each scrubbing task, namely, scrubbing task scheduling, can be obtained by solving an integer planning system including the objective function shown in the formula (2) and a constraint condition shown in the formula (3).

(2) NDS algorithm: The NDS algorithm approximately solves a scrubbing task scheduling problem through iteration. Within a scheduling window, scheduling time is first discretized, and each time node represents a time period of SI. By recording a congestion level on each time node, global scrubbing task congestion level information can be obtained. Based on a discretized time node and a to-be-scheduled scrubbing task, scheduling graph DSSG is first generated. A construction method is as follows: Firstly, each scrubbing task node is connected to a time node within its feasible scheduling interval. Secondly, each adjacent time node is connected. Each time node has congestion level information to help the NDS algorithm avoid a high-congestion time node.

The NDS algorithm is an iterative algorithm, and each iteration includes following specific steps:

Step 201: A shortest path from a scrubbing task node to a maximum feasible scheduling interval of the scrubbing task node is calculated based on $\text{path}_{cost}$ in following formula (4):

$$\begin{aligned} \text{path}_{cost} &= \text{conflict}_{cost} + \text{reliability}_{cost} \\ &= (1-\xi_i) \times \sum_{n=m} c_n + \xi_i \times \left( \left\lfloor \frac{sl\max_i^k}{SI} \right\rfloor - m + \left\lceil \frac{SW_i}{SI} \right\rceil \right) \end{aligned} \quad (4)$$

In the formula (4), $conflict_{cost}$ represents a result of subtracting a total quantity of available ICAP ports in the system from a total quantity of ICAP ports required by the system during a scrubbing period of a currently considered scrubbing job, $reliability_{cost}$ represents a time interval between the currently considered scrubbing job and a corresponding user job, $c_n$ represents a congestion level on time node n, SI represents the minimum unit of the time discretization, $$sl\max_i^k$$

represents a maximum feasible scheduling interval of a $k^{th}$ scrubbing job of an $i^{th}$ scrubbing task, $SW_i$ represents running time of the $i^{th}$ scrubbing task, and m represents a currently investigated time node. It can be observed that $path_{cost}$ considers both the system reliability and the conflict between the scrubbing tasks. The two indicators are optimized simultaneously by finding the shortest path.

Step 202: The scrubbing job is scheduled to a first time node on the shortest path to obtain optimal scheduling of the current scheduling job.

Step 203: Congestion level $c_n$ on a time node on which the scrubbing scheduling job is scheduled is updated. This ensures that a subsequent scrubbing job can promptly perceive updated congestion level information.

Step 204: A remaining scrubbing job is continuously scheduled until there is no conflict between scrubbing tasks or a specified maximum quantity of iterations is reached.

FIG. 2 illustrates a specific implementation of the NDS algorithm in this embodiment. As shown in FIG. 2, all candidate scrubbing jobs generated in the step 1 are scheduled in order. In each iteration of the scrubbing scheduling algorithm, the current scheduling is discarded, and each scrubbing job is rescheduled by finding the shortest path in the scheduling graph. Subsequently, the algorithm updates congestion level information for each time node on the scheduling graph for a next scheduling iteration. The scheduling algorithm is terminated when there is no conflict between scrubbing jobs or after a fixed quantity of iterations fail.

Step 3: The scheduling is legalized. Firstly, in the step 3, a conflicting scrubbing job that cannot be resolved in the step 2 is identified, and some scrubbing tasks are dynamically deleted to ensure that there is no conflict between legalized scrubbing job scheduling.

Specific steps for legalizing the scheduling are as follows:

A congestion level is sequentially checked for each time node. If a quantity of ICAP ports required on the current time node exceeds the total quantity of ICAP ports in the system, the current time node is considered as an illegal scheduling node, and some scrubbing jobs are deleted to meet a requirement for the quantity of ICAP ports.

If a congestion level on the current time node is greater than 0, a probability of scrubbing each scrubbing job on the time node is calculated, and the first n scrubbing jobs are deleted. Herein, n represents a result of subtracting the total quantity of available ICAP ports in the system from the quantity of ICAP ports required on the time node.

Each time node of a current scheduling window is iteratively traversed until all conflicts are resolved.

A probability of deleting each scrubbing job is calculated according to formula (5):

$$p_n^{i,k} = \frac{1}{1+e^{-\theta^T w}} = \frac{1}{1+e^{-(\theta_1 w_1 w_3 + \theta_2 w_2)}} \tag{5}$$

In the above formula (5), $$p_n^{i,k}$$

represents a probability of deleting the $k^{th}$ scrubbing job of the $i^{th}$ scrubbing task on the $n^{th}$ time node, $w_1$, $w_2$, and $w_3$ respectively represent time since the $i^{th}$ user task is last scrubbed, a total quantity of conflicts between the $k^{th}$ scrubbing job and other scrubbing job, and importance of the $k^{th}$ scrubbing job of the $i^{th}$ scrubbing task, and $\theta_1$ and $\theta_2$ represent user-customized weights. This calculation method ensures that an important task is scrubbed more frequently, while also preventing hunger scheduling of a secondary task.

If there are the plurality of ICAP scrubbing ports in the system, a legalization step makes full use of the excess ICAP port to dynamically allocate the scrubbing port for each scrubbing task through the graph coloring. An ICAP port allocation algorithm is as follows:

All scrubbing jobs in a scheduling window are arranged in an ascending order based on start time of all the scrubbing jobs.

An ICAP port is allocated to each scrubbing job in an arrangement order. A port allocation strategy for each scrubbing job is as follows: If the scrubbing job is located on a time node on which no ICAP port is allocated to other scrubbing job, any ICAP port in the system is randomly selected. If the scrubbing job is located on a time node on which an ICAP port is already allocated to other scrubbing job, an unused ICAP port is randomly selected from the system.

Because the scheduling legalization step ensures zero congestion on any time node, the ICAP port allocation algorithm mentioned above can be used to ultimately allocate a legal ICAP port for each scrubbing job.

FIG. 3 schematically illustrates a specific implementation of the ICAP port allocation algorithm in this embodiment. As shown in FIG. 3, a scheduled scrubbing job set is sorted based on an ascending order of start time of each scrubbing task. In a subsequent allocation process, starting from a first job in a sorted job set, a neighboring node to which an ICAP port is allocated is found, and then the same ICAP port is not allocated to the considered scrubbing job. Herein, a mapping data structure is used to track ICAP port allocation information. Initially, all scrubbing jobs are annotated as unallocated. After an ICAP port is already allocated to a scrubbing job, the mapping data structure is updated. A potential scrubbing conflict on each time node has been eliminated in a scrubbing legalization stage. Therefore, the ICAP port allocation algorithm in the present disclosure can always find a legal ICAP port allocation strategy for scrubbing job. Final ICAP port allocation can be achieved by traversing each scrubbing task in the scrubbing job set using the above algorithm.

Step 4: The scheduling is locally optimized. Due to a heuristic nature of the algorithm in the step 2, the scrubbing scheduling generated in the step 3 may have some suboptimal scheduling. In the step 4, the scrubbing scheduling generated in the step 3 is iteratively optimized based on a local optimal scheduling condition. Finally, the scrubbing scheduling generated in the step 4 is executed by a scrubbing module. An algorithm for local optimizing the scrubbing scheduling is as follows:

All scrubbing jobs in a scheduling window are arranged in an descending order based on start time of all the scrubbing jobs.

Two adjacent scrubbing jobs are sequentially optimized in an arrangement order.

For the two adjacent scrubbing jobs, a compact operator is first run. If there is a time gap between the two scrubbing jobs, a scrubbing job with earlier start time is rescheduled to make the scrubbing job adjacent to the other scrubbing job to eliminate the time gap.

For the two adjacent scrubbing jobs, running a swap operator, and if the two scrubbing jobs have different scrubbing time, swapping one scrubbing job with longer scrubbing time and the other scrubbing job with shorter scrubbing time to ensure that the other scrubbing job with the shorter scrubbing time always runs later.

The time interval between the scrubbing job and the user job is reduced by reducing the time gap between the scrubbing jobs, making the generated scheduling more reliable.

FIG. 4 shows a local scheduling improvement algorithm in this embodiment, which runs in a plurality of iterations. In each iteration, the local scheduling improvement algorithm sequentially finds an optimization opportunity for each pair of adjacent scrubbing jobs from the end of the scheduling window to the beginning of the scheduling window. Firstly, the algorithm checks whether it can legally perform local optimization for each pair of adjacent scrubbing jobs. Start and end time of each job pair form a local refinement window. The job pair can be optimized locally and legally only when completion time of the window is earlier than maximum feasible scheduling time of the two scrubbing jobs. After the legality is checked, the compact operator and the swap operator are used in sequence to refine the scheduling. After the local optimization, the final scrubbing scheduling is generated.

The above solution is implemented on an SRAM-based FPGA system. For any system with a high reliability requirement, high-quality scrubbing scheduling can be generated for each user task by extracting task information from the system and using the proposed scheduling algorithm.

What is claimed is:

1. A window-based dynamic scrubbing scheduling method, comprising the following steps:

step 1: controlling scheduling congestion between scrubbing jobs by performing linear integer programming (LIP) and using a usage rate ubound of an Internet Content Adaptation Protocol (ICAP) module in a field-programmable gate array (FPGA) system, and generating a candidate scrubbing job within each scrubbing cycle;

step 2: scheduling the scrubbing job proposed in the step 1 while minimizing scrubbing port conflicts between different scrubbing jobs, wherein a scrubbing conflict is resolved by using a heuristic negotiation-driven scheduling (NDS) algorithm or an integer linear programming (ILP)-based optimization-driven scheduling (ODS) method, wherein scrubbing scheduling is converted by the heuristic NDS algorithm into an ILP problem for solution;

wherein the NDS algorithm is an iterative algorithm, and each iteration comprises the following steps:

step 201: calculating a shortest path from a scrubbing task node to a maximum feasible scheduling interval of the scrubbing task node based on $path_{cost}$ in a following formula:

$$\begin{aligned}path_{cost} &= conflict_{cost} + reliability_{cost} \\ &= (1-\xi_i)\times\sum\nolimits_{n=m} c_n + \xi_i \times\left(\left\lfloor\frac{sl\max_i^k}{SI}\right\rfloor - m + \left\lceil\frac{SW_i}{SI}\right\rceil\right)\end{aligned}$$

wherein $conflict_{cost}$ represents a result of subtracting a total quantity of available ICAP ports in the system from a total quantity of ICAP ports required by the system during a scrubbing period of a currently considered scrubbing job, $reliability_{cost}$ represents a time interval between the currently considered scrubbing job and a corresponding user job, $c_n$ represents a congestion level on a time node n, SI represents a minimum unit of time discretization, $$sl\max_i^k$$

represents a maximum feasible scheduling interval of a $k^{th}$ scrubbing job of an $i^{th}$ scrubbing task, $SW_i$ represents running time of the $i^{th}$ scrubbing task, m represents a currently investigated time node, and $\xi_i$ represents importance of an $i^{th}$ user task;

step 202: scheduling the scrubbing job to a first time node on the shortest path to obtain optimal scheduling of the current scheduling job;

step 203: updating a congestion level $c_n$ on a time node on which the scrubbing scheduling job is scheduled; and step 204: continuously scheduling a remaining scrubbing job until there is no conflict between scrubbing tasks or a specified maximum quantity of iterations is reached;

step 3: identifying a conflicting scrubbing job that is not resolved in the step 2, and dynamically deleting some scrubbing tasks to ensure that there is no conflict between legalized scrubbing job scheduling; and if there are a plurality of ICAP scrubbing ports in the FPGA system, using an excess ICAP port to dynamically allocate a scrubbing port for each scrubbing task through graph coloring; and step 4: iteratively optimizing, based on a local optimal scheduling condition, the scrubbing scheduling generated in the step 3, such that the generated scrubbing scheduling is finally executed by a scrubbing module.

2. The window-based dynamic scrubbing scheduling method according to claim 1, wherein the step 1 comprises the following steps:

step 101: adjusting a scrubbing cycle $ST_i$ of each user task by solving the ILP problem in a following formula:

$$\text{Objective: minimize } \sum_{i=1}^{|S\Lambda|}\frac{ST_i}{T_i}\times\xi_i \text{ s.t. } \sum_{i=1}^{|S\Lambda|}\frac{SW_i}{ST_{i_i}}\times ubound$$

wherein $SW_i$ represents scrubbing time of a scrubbing task corresponding to the $i^{th}$ user task, $T_i$ represents a running cycle of the $i^{th}$ user task, $ST_i$ represents a running cycle of the scrubbing task corresponding to the $i^{th}$ user task, $\xi_i$ represents the importance of the $i^{th}$ user task, |SA| represents a quantity of scrubbing tasks in the FPGA system, and ubound represents a usage rate of the ICAP module in the FPGA system; and step 102: generating the candidate scrubbing job within each scrubbing cycle based on a scrubbing cycle of a generated scrubbing task for scheduling in a subsequent step; and if there are the plurality of ICAP scrubbing ports in the FPGA system, using the excess ICAP port to dynamically allocate the scrubbing port for each scrubbing task through the graph coloring.

3. The window-based dynamic scrubbing scheduling method according to claim 1, wherein in the step 2, an ODS algorithm model comprises three groups of 0-1 decision variables, namely X,Y,Z=$\{x_{lt}, y_{lt}, z_{lt}$; l=0, 1, . . . , |SE|−1, t=0, 1, 2, . . . , N−1$\}$, wherein SE represents a job set containing all scrubbing jobs in the scheduling, |SE| represents a length of the job set, and N represents a time length of a current scheduling window, wherein when the heuristic NDS algorithm is used to resolve the scrubbing conflict, start time of each scrubbing task, namely, scrubbing task scheduling, is calculated by solving an integer planning system comprising an objective function shown in a formula (1) and a constraint condition shown in a formula (2);

$$\text{Minimize}_{\{X,Y,Z\}} \kappa_1 \times \text{relialibity} + \kappa_2 \times \text{conflict} \quad (1)$$

in the formula (1), the reliability function describes a time interval between a scrubbing task and a user task, $$\text{relialibity} = \sum_l \xi_l \left( \left( \sum_t t y_{lt} \right) - \left\lceil \frac{sl\max_l}{SI} \right\rceil \right),$$

and system reliability is optimized by minimizing the reliability function, wherein $\Sigma_t t y_{lt}$ describes the start time of each scrubbing task, SI represents the minimum unit of the time discretization, $\text{slmax}_l$ represents a maximum feasible scheduling interval of a scrubbing task l; conflict=$\Sigma_t z_t$, wherein a conflict between scrubbing tasks is optimized by minimizing the conflict function, and $z_t$ represents a port conflict for each time node; and $\kappa_1$ and $\kappa_2$ represent weights of the two objective functions; and $$\begin{cases} \sum_t y_{lt} = 1, \forall\, l = 0, 1, 2, \ldots |SE| - 1 \\ \left\lceil \frac{sl\min_l}{SI} \right\rceil \le \sum_t t y_{lt} \le \left\lfloor \frac{sl\max_l}{SI} \right\rfloor, \forall\, l = 0, 1, 2, \ldots |SE| - 1 \\ \sum_t x_{lt} = SW_l, \forall\, t = 0, 1, 2, \ldots N - 1 \\ \sum_l x_{lt} - |AI| \le z_t, \forall\, t = 0, 1, 2, \ldots N - 1 \\ \sum_{s=0}^{SW_l - 1} (x_{\{l(t+s)\}} - 1) \ge SW_l(y_{lt} - 1), \forall\, t = 0, 1, 2, \ldots N - 1 \end{cases} \quad (2)$$

in the formula (2), $\text{slmin}_l$ represents a minimum value of a feasible scheduling interval of the scrubbing job, and $SW_l$ represents running time required for the scrubbing job.

4. The window-based dynamic scrubbing scheduling method according to claim 1, wherein the step of dynamically deleting some scrubbing tasks in the step 3 comprises the following steps:

sequentially checking a congestion level for each time node: if a quantity of ICAP ports required on the current time node exceeds the total quantity of ICAP ports in the system, considering the current time node as an illegal scheduling node, and deleting some scrubbing jobs to meet a requirement for the quantity of ICAP ports;

if a congestion level on the current time node is greater than 0, calculating a probability of scrubbing each scrubbing job on the time node, and deleting the first n scrubbing jobs, wherein n represents a result of subtracting the total quantity of available ICAP ports in the system from the quantity of ICAP ports required on the time node; and iteratively traversing each time node of a current scheduling window until all conflicts are resolved.

5. The window-based dynamic scrubbing scheduling method according to claim 4, wherein a probability of deleting each scrubbing job is calculated according to a following formula:

$$p_n^{i,k} = \frac{1}{1 + e^{-\theta^T w}} = \frac{1}{1 + e^{-(\theta_1 w_1 w_3 + \theta_2 w_2)}}$$

wherein $$p_n^{i,k}$$

represents a probability of deleting the $k^{th}$ scrubbing job of the $i^{th}$ scrubbing task on the $n^{th}$ time node, $w_1$, $w_2$, and $w_3$ respectively represent time since the $i^{th}$ user task is last scrubbed, a total quantity of conflicts between the $k^{th}$ scrubbing task and other scrubbing task, and importance of an $i^{th}$ scrubbing job, and $\theta_1$ and $\theta_2$ represent user-customized weights; and if there are the plurality of ICAP scrubbing ports in the system, a legalization step makes full use of the excess ICAP port to dynamically allocate the scrubbing port for each scrubbing task through the graph coloring.

6. The window-based dynamic scrubbing scheduling method according to claim 1, wherein the step of dynamically allocating the scrubbing port to each scrubbing task in the step 3 comprises the following steps:

step 301: arranging all scrubbing jobs in a scheduling window in an ascending order based on start time of all the scrubbing jobs; and step 302: allocating an ICAP port to each scrubbing job in an arrangement order, wherein a strategy for allocating the ICAP port to each scrubbing job is as follows: if the scrubbing job is located on a time node on which no ICAP port is allocated to other scrubbing job, randomly selecting any ICAP port in the FPGA system; or if the scrubbing job is located on a time node on which an ICAP port is already allocated to other scrubbing job, randomly selecting an unused ICAP port from the system.

7. The window-based dynamic scrubbing scheduling method according to claim 1, wherein in the step 4, the step of iteratively optimizing, based on the local optimal scheduling condition, the scrubbing scheduling generated in the step 3 comprises the following steps:

step 401: arranging all scrubbing jobs in a scheduling window in a descending order based on start time of all the scrubbing jobs; and step 402: sequentially optimizing two adjacent scrubbing jobs in an arrangement order, comprising:

for the two adjacent scrubbing jobs, first running a compact operator; and if there is a time gap between the two scrubbing jobs, rescheduling a scrubbing job with earlier start time to make the scrubbing job adjacent to the other scrubbing job to eliminate the time gap; and for the two adjacent scrubbing jobs, running a swap operator, and if the two scrubbing jobs have different scrubbing time, swapping one scrubbing job with longer scrubbing time and the other scrubbing job with shorter scrubbing time to ensure that the other scrubbing job with the shorter scrubbing time always runs later.

* * * * *